United States Patent
Wood et al.

(10) Patent No.: US 9,454,314 B2
(45) Date of Patent: Sep. 27, 2016

(54) SYSTEMS AND METHODS FOR CREATING AN IMAGE OF A VIRTUAL STORAGE DEVICE

(71) Applicants: Conrad N. Wood, Berlin (DE); Achim Weiss, Berlin (DE)

(72) Inventors: Conrad N. Wood, Berlin (DE); Achim Weiss, Berlin (DE)

(73) Assignee: ProfitBricks, Inc., Cambridge, MA (US)

( * ) Notice: Subject to any disclaimer, the term of this patent is extended or adjusted under 35 U.S.C. 154(b) by 32 days.

(21) Appl. No.: 14/200,751

(22) Filed: Mar. 7, 2014

(65) Prior Publication Data

US 2015/0254007 A1    Sep. 10, 2015

(51) Int. Cl.
*G06F 12/00* (2006.01)
*G06F 3/06* (2006.01)

(52) U.S. Cl.
CPC ............. *G06F 3/0619* (2013.01); *G06F 3/065* (2013.01); *G06F 3/0665* (2013.01); *G06F 3/0689* (2013.01)

(58) Field of Classification Search
CPC .... G06F 3/0619; G06F 3/065; G06F 3/0665; G06F 3/0689
USPC ................ 711/114, 151, 156, 170, 206, 207; 709/215, 225, 229; 710/21, 26, 36, 53, 710/308; 712/216, 220
See application file for complete search history.

(56) References Cited

U.S. PATENT DOCUMENTS

| | | |
|---|---|---|
| 8,479,266 B1 | 7/2013 | Delker et al. |
| 8,484,355 B1 | 7/2013 | Lochhead et al. |
| 8,959,523 B2 * | 2/2015 | Patil .................... G06F 9/45558 709/220 |
| 2002/0122394 A1 | 9/2002 | Whitmore et al. |
| 2005/0120160 A1 | 6/2005 | Plouffe et al. |
| 2006/0047923 A1 * | 3/2006 | Kodama ............... G06F 3/0626 711/161 |
| 2006/0101221 A1 * | 5/2006 | Harada ................. G06F 3/0605 711/170 |
| 2006/0155708 A1 * | 7/2006 | Brown ................ H04L 12/4679 |
| 2007/0028244 A1 | 2/2007 | Landis et al. |
| 2009/0112919 A1 | 4/2009 | De Spiegeleer |
| 2010/0070731 A1 * | 3/2010 | Mizuno ................. G06F 1/3203 711/170 |
| 2011/0066823 A1 | 3/2011 | Ando et al. |
| 2011/0271010 A1 * | 11/2011 | Kenchammana ......... G06F 3/06 709/244 |
| 2012/0030404 A1 | 2/2012 | Yamamoto et al. |

(Continued)

FOREIGN PATENT DOCUMENTS

| | | |
|---|---|---|
| EP | 2 413 549 A1 | 2/2010 |
| EP | 2 482 496 A1 | 8/2012 |

OTHER PUBLICATIONS

U.S. Appl. No. 13/835,013, filed Mar. 15, 2013, Weiss et al.

(Continued)

*Primary Examiner* — Reba I Elmore
(74) *Attorney, Agent, or Firm* — Daly, Crowley, Mofford & Durkee, LLP

(57) ABSTRACT

A cloud storage system is described. The system includes at least one virtual server comprising at least one virtual storage device, at least one physical machine which includes at least one physical storage device having a data structure stored thereon. The data structure includes a first table of contents associated with a first virtual storage device, and a second table of contents associated with a second virtual storage device. The second virtual storage device is a copied snapshot of the first virtual storage device. The second table of contents is configured to map storage locations within the virtual storage device to node structures that provide pointers to corresponding storage locations with the physical storage device. At least some of the node structures and storage locations are shared by the first and second tables of contents.

28 Claims, 13 Drawing Sheets

(56) References Cited

U.S. PATENT DOCUMENTS

| | | | |
|---|---|---|---|
| 2012/0144014 A1* | 6/2012 | Natham | H04L 45/66 709/224 |
| 2012/0207174 A1* | 8/2012 | Shieh | H04L 47/125 370/401 |
| 2013/0019018 A1* | 1/2013 | Rice | H04L 12/66 709/226 |
| 2013/0136126 A1* | 5/2013 | Wang | H04L 61/103 370/392 |
| 2013/0263120 A1 | 10/2013 | Patil et al. | |
| 2013/0263125 A1 | 10/2013 | Shamsee et al. | |
| 2014/0101657 A1* | 4/2014 | Bacher | G06F 9/45558 718/1 |
| 2014/0108655 A1 | 4/2014 | Kumar et al. | |
| 2014/0359245 A1* | 12/2014 | Jones | G06F 3/06 711/170 |
| 2015/0254007 A1 | 9/2015 | Wood et al. | |
| 2016/0112258 A1 | 4/2016 | Zhou et al. | |

OTHER PUBLICATIONS

U.S. Appl. No. 14/200,784, filed Mar. 7, 2014, Wood et al.
U.S. Appl. No. 14/200,764, filed Mar. 7, 2014, Wood et al.
U.S. Appl. No. 14/200,935, filed Mar. 7, 2014, Wood et al.
U.S. Appl. No. 14/200,948, filed Mar. 7, 2014, Wood et al.
Office Action dated Jul. 2, 2015; for U.S. Appl. No. 13/835,013; 16 pages.
Invitation to Pay Additional Fees for PCT/2014/027112 dated Jul. 3, 2014.
Notice of Allowance dated Oct. 2, 2015; for U.S. Appl. No. 14/200,935; 13 pages.
Non-Final Office Action dated Oct. 7, 2015; for U.S. Appl. No. 14/200,764; 16 pages.
PCT Search Report and Written Opinion of the ISA dated Sep. 9, 2014; for PCT Pat. App. No. PCT/US2014/027112; 14 pages.
Non-Final Office Action dated May 4, 2016; for U.S. Appl. No. 14/200,784; 21 pages.
Response dated Nov. 2, 2016 to Office Action dated Jul. 2, 2016; for U.S. Appl. No. 13/835,013; 13 pages.
Office Action dated Dec. 4, 2015; for U.S. Appl. No. 14/200,948; 15 pages.
"SolarWinds Network Management Guide", Cisco System, Dec. 2010; 20 pages.
Final Office Action dated Feb. 9, 2016; for U.S. Appl. No. 13/835,013; 32 pages.
Response filed Feb. 7, 2016 to Non-Final Office Action dated Oct. 7, 2015; for U.S. Appl. No. 14/200,764; 12 pages.
Notice of Allowance dated Feb. 26, 2016; for U.S. Appl. No. 14/200,764; 11 pages.

\* cited by examiner

SYSTEMS AND METHODS FOR CREATING AN IMAGE OF A VIRTUAL STORAGE DEVICE

The concepts described herein relate generally to cloud storage systems (i.e. a group of networked physical storage devices and servers working in conjunction to provide a pool of physical storage to be shared among a number of different users) and more particularly to virtual storage drives within cloud storage systems, and creating snapshots of virtual storage devices.

BACKGROUND

As is known in the art, a data center is a facility used to house computer systems and associated components, such as telecommunications and storage systems. It generally includes redundant or backup power supplies, redundant data communications connections, redundant servers and storage devices, environmental controls (e.g., air conditioning, fire suppression) and security devices (collectively referred to as data center equipment).

As is also known, there is a trend to replace or consolidate multiple data center equipment, such as servers. One technique to consolidate resources is to simulate a hardware platform, operating system (OS), storage device, or other network resources (this method of consolidation may be referred to as "virtualization"). Here, a bank of computing resources (e.g. computing and/or storage devices) and host computers/servers are coupled together through an interface (typically implemented in software). The interface includes host computers/servers that can be controllers (or storage processors) and computers/servers that can function as storage device controllers.

A client- or user-facing software interface provides users with access to the back-end computing devices. The infrastructure implemented by the service is typically transparent to the user and abstracted by the user-facing interface (i.e. the interface operates the controllers in such a way that they are transparent to the user and host computer/server). Thus, data (for example) may be stored in, and retrieved from a bank of disk drives in such a way that the host computer/server appears as if it is operating with a single drive. In other words, as long as the user receives the proper services through the user interface, the user may not need to understand how the servers that implement those services operate. Virtualization technologies may also be used to create virtual desktops, which can then be hosted in data centers and leased to users on a subscription basis.

Such user interfaces can provide a user with access to virtual storage. For example, a user may store data onto a virtual hard drive provided by the front end interface. To the user, the virtual hard drive appears as a regular, physical hard drive or other physical storage medium. However, the data may be stored in one or more of a group of networked physical servers working in conjunction to provide a pool of physical storage (i.e. the aforementioned "cloud storage"). Thus, the data stored by a user onto the virtual storage drive may be stored on any one or more of the networked physical servers.

When conventional cloud storage systems deal with a large number of read/write transactions, an undesirably long period of time may be required to complete the transactions. This is due, at least in part, to the amount of overhead which exists in read/write transactions in conventional cloud storage systems. It would, therefore, be desirable to provide a system and technique to reduce the amount of time required to execute read/write transactions between a user and a cloud storage system.

SUMMARY

In accordance with the concepts described herein, a system for providing data storage A system for providing data storage includes: at least one virtual server comprising at least one virtual storage device; at least one physical server comprising at least one physical storage device; a data structure, stored on each of the at least one physical storage devices, the data structure comprising: a first table of contents associated with a parent virtual storage device, the first table of contents configured to map storage locations within the virtual storage device to node structures that provide pointers to corresponding storage locations within the physical storage device; and a second table of contents associated with a second virtual storage device which is a copy of the first table of contents, the second table of contents configured to map storage locations within the virtual storage device to node structures that provide pointers to corresponding storage locations with the physical storage device, wherein at least some of the node structures and storage locations are shared by the first and second tables of contents. The system also includes one or more software modules executed by the virtual server, the physical server or both, configured to receive requests to access data in the storage locations within the virtual storage devices and, in response to the requests, traverse the data structure to access data in the corresponding storage locations within the physical storage device.

With this particular arrangement, a system for providing data storage which allows for snapshots of the virtual storage device to be made and manipulated reduces overhead in read/write transactions in a cloud based storage system is provided. Utilizing tree-based structures, reference lists, and metadata pointer records allows the system to make copies or snapshots of virtual hard drives while the virtual hard drives are in use.

BRIEF DESCRIPTION OF THE DRAWINGS

The foregoing features of the concepts, systems and techniques described herein, may be more fully understood from the following description of the drawings. It should be noted that the drawings are provided as examples to assist in describing embodiments of the technology and concepts for which protection is sought. Other illustrations and embodiments may fall under the scope of the invention(s) described in this document. Thus, the drawings should not be construed to limit the scope of the invention.

Like numbers in the drawings denote like elements.

DETAILED DESCRIPTION

Before describing exemplary embodiments which illustrate the concepts, systems, circuits and techniques sought to be protected, some introductory concepts and terminology are explained.

Reference is made herein to a "virtual computer." A virtual computer is a software implementation of a physical computer (i.e. a virtual computer is a software based computer or stated differently is a computer software application that simulates a physical computer). Desktop computers, laptop computers, server computers, mobile computers, tablets, etc. are all examples of physical computers.

A physical computer is also sometimes referred to in the art as a "physical machine" (or more simply a "machine") and hence the terms "virtual computer" and "virtual machine" can be used interchangeably. The virtual machine executes programs as if it were a physical machine. Operating characteristics of a virtual machine may be based upon specifications of a hypothetical computer or the virtual machine operating characteristics may emulate the computer architecture and functions of a real world physical computer.

When a virtual machine performs the functions of a server computer, the virtual machine is referred to as a "virtual server."

The term "virtual computing services" refers to computing services provided by a virtual machine.

Reference is also made herein to a "virtual storage device" "virtual hard drive," "virtual storage device," and "virtual storage." These terms refer to a software application that simulates a storage device such as a hard drive, solid state hard drive, flash drive, and the like. These terms are used interchangeably herein. The software that simulates a storage device may be part of or separate from a virtual machine.

The terms "physical storage device," "physical drive," "physical hard drive," and "physical storage" are used to describe a physical, hardware storage device such as a hard drive, solid state hard drive, flash drive, and the like. These terms are used interchangeably.

The term "software module" (or more simply a "module") refers to a unit or component of software that embodies a particular functionality or set of functionalities. A software module can be a discrete software component, such as a software application or library. A software module can also be integral to (e.g. part of) a software application, library, or another software module.

The term "snapshot" is used herein to refer to one or more types of a dynamic image, copy, or data branch of a drive volume or a portion of a drive volume. The snapshot may refer to a "picture" or "image" of the drive volume that can be modified or altered, in some cases without affecting the data in the original or parent volume. In general, the term snapshot refers to the structures, data structures, functions, and functionality used in connection with the term "snapshot" throughout the specification below.

Figure 1:
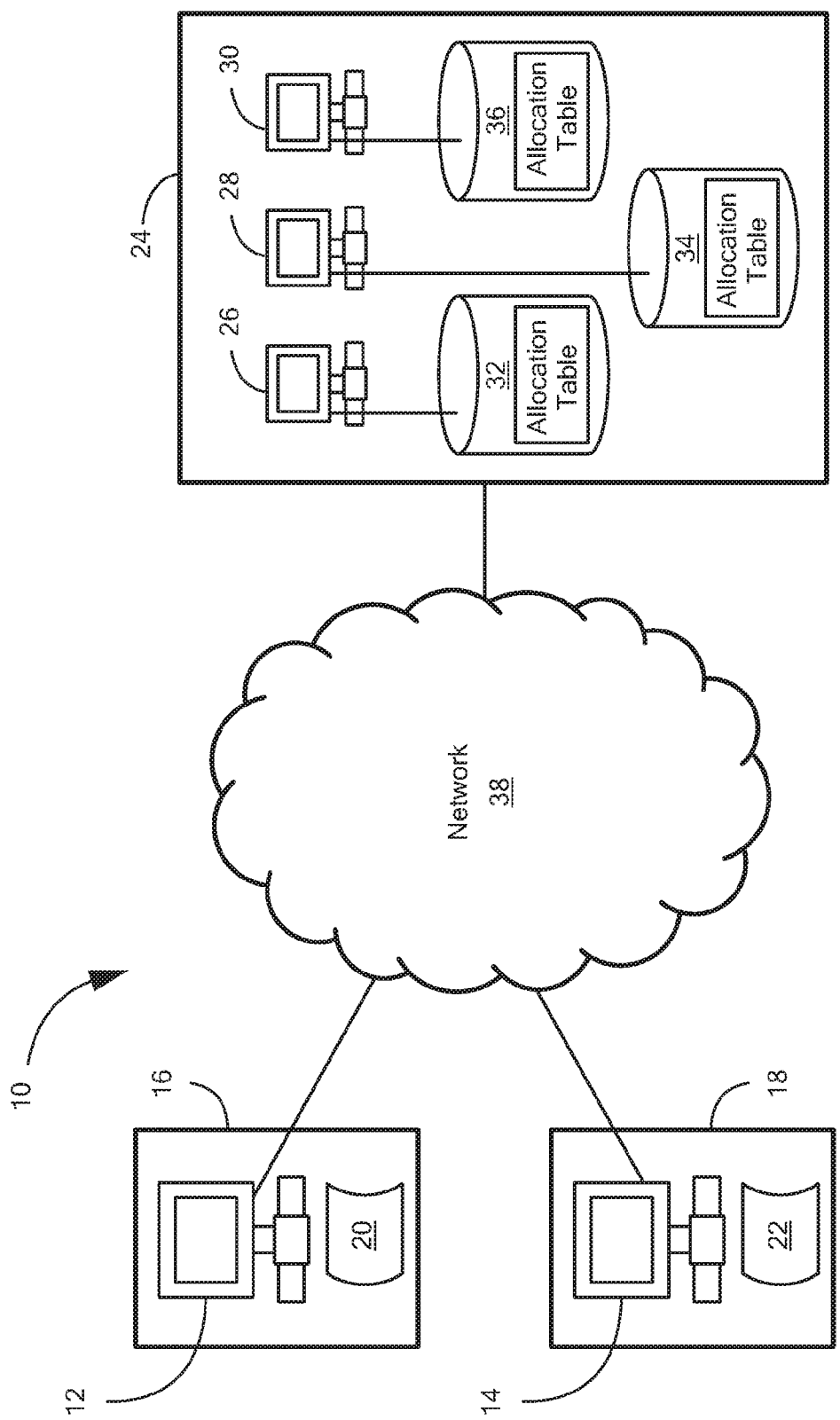
FIG. 1 is a block diagram of a computer system for providing computing services including virtual storage services.

Referring now to FIG. 1, a system for providing data storage 10 includes one or more virtual machines 12, 14 executing on respective ones of physical machines 16, 18. Here, virtual machines 12, 14 include at least one virtual storage device, 20, 22. The virtual machines 12, 14 are coupled, here though the or a network 38, to at least one of physical servers 26-30 each of which includes at least one physical storage device 32-36.

Each of the at least one physical storage devices 32-26 has a data structure stored thereon. The data structures will be described in detail below in conjunction with FIG. 3. Suffice it here to say that each data structure includes at least one table of contents configured to map storage locations within the virtual storage device to node structures that provide pointers to corresponding storage locations within the physical storage device and a tree structure having a predetermined number of hierarchical levels, with each level containing node structures which contain pointers that point to other node structures or to data locations on the physical storage device. The system further includes one or more core modules (e.g. driver-like software), executed by the virtual server, the physical server or both, configured to receive requests to access data in the storage locations within the virtual storage device and, in response to the requests, traverse the data structure to access data in the corresponding storage locations within the physical storage device. In some embodiments, the core modules could be distributed between front-end and back-end portions of the system 10.

System 10 is thus configured to provide virtual computing services to a user. Typically, a user accesses virtual machines 12 and 14 and virtual machines 12, 14 emulate the functionality of a computer and provide an interface to the user so that the user can access the functionality. Virtual machines 12, 14 thus may emulate the functionality of server computers, desktop computers, laptop computers, smartphones, mobile computers such as tablets, or any other type of computing device. The particular functionality of each virtual machine is determined based upon the requirements of each particular application.

Virtual machines 12, 14 may, for example, be executed by a physical computer at the customer's physical site or at a service site. For example, as shown, virtual machine 12 may be a software application executed by physical computer 16 and virtual machine 14 may be a software application executed by physical computer 18. Alternatively, virtual machines 12 and 14 may be executed by the same physical computer, which may be configured to execute multiple virtual server applications at the same time. In other embodiments, virtual machines 12, 14 may be executed by a remote computer and the user can access virtual machines 12 and 14 through a computer network, browser interface, or software application.

Virtual machines 12 and 14 have associated virtual storage devices 20 and 22, respectively. As noted above, virtual storage devices 20 and 22 are software applications, modules, or software-based features that provide storage services. The virtual storage devices 20 and 22 may act like physical hard drives that a user can access and use. Although shown as separate elements from the virtual servers, virtual storage devices 20 and 22 may be part of a virtual server application, a feature of a virtual server application, a software module associated with the virtual servers, etc. Virtual storage devices 20, 22 may also be provided by computer software applications which are separate from computer software applications which implement virtual machines 12, 14, and may be executed by computers or computing devices other than those that execute computer software for virtual machines 12, 14. Virtual storage devices 20 and 22 can be configured to function like any type of storage device including, but not limited to, platter-based hard drives, solid state hard drives, flash drives, thumb drives, and the like. Virtual storage devices 20 and 22 can also be configured to provide backup or redundancy services like redundant array of inexpensive disk (RAID) services 0, I, V, or X, or other backup and redundancy services.

System 10 also has a so called server block 24, which may be a set of computers, servers, and other devices that typically are not directly accessible by a user of system 10. In the exemplary embodiment of FIG. 1, service block 24 includes one or more physical servers 26, 28, and 30. The physical servers 26, 28, and 30 provide computing resources such as processor time, network access, physical data storage, and other services and resources. The virtual servers 12 and 14 may draw on the services and resources provided by physical servers 26, 28, and 30 to provide computing services to a user. Physical servers (and other devices in server block 24) may be located in a single physical location or in multiple, geographically separated, physical locations.

Physical servers 26, 28, and 30 are computers that execute operating systems and other software to provide computing services. Each physical server 26, 28, and 30 has an associated physical storage device 32, 34, 36, respectively. Each physical storage device includes an allocation table containing metadata that provides information about the physical storage device and allows the system to navigate the physical storage device to locate data. As will be described in detail in conjunction with FIG. 3 below, the metadata in the allocation table is organized in a linked data structure which can be viewed and organized as a tree.

Although in FIG. 1 a single storage device is shown to be associated with a single physical server, physical servers 26, 28, and 30 may each have multiple physical storage devices depending upon the services provided by the physical server. In some embodiments, at least some physical servers in back end 24 do not have an associated physical storage device.

Physical storage devices 32, 34, and 36 may be hard drives, solid state hard drives, RAID arrays, networked hard drive banks, or any other type of physical data storage device. In embodiments, physical storage devices 32, 34, and 36 are block storage devices. As known in the art, a block is a storage area having a predetermined size on a hard disk (or other storage device). In other words, data can be written to and read from physical storage devices 32, 34, and 36 by addressing blocks on the physical storage devices and by reading and writing data into the blocks in block-sized increments.

Virtual servers 12 and 14 communicate with back end 24 through a network 38. Network 38 can be a LAN, a WAN, an internet, a cellular network, a 3G or 4G network, an Infiniband®/RDMA network, or any other type of network for data communication.

In operation, network 38 allows physical servers in the back-end 24 to communicate with and provide services to virtual servers 12 and 14. For example, a user using virtual server 12 may perform an operation that stores data to virtual storage device 20. The stored data may travel through network 38 to back-end 24 where it is stored on one or more of the physical storage devices 32, 34, 36. When the user performs an operation to read data from virtual storage device 20, virtual server 12 communicates with physical servers 26, 28, and/or 30 over network 38 to retrieve the data and provide it to the user. By accessing the virtual server 12, it appears to the user that the data is stored on virtual storage device 20 while, in actuality, the data is stored in the back end 24 on physical storage devices 32, 34, and 36 and accessed through network 38.

Figure 2:
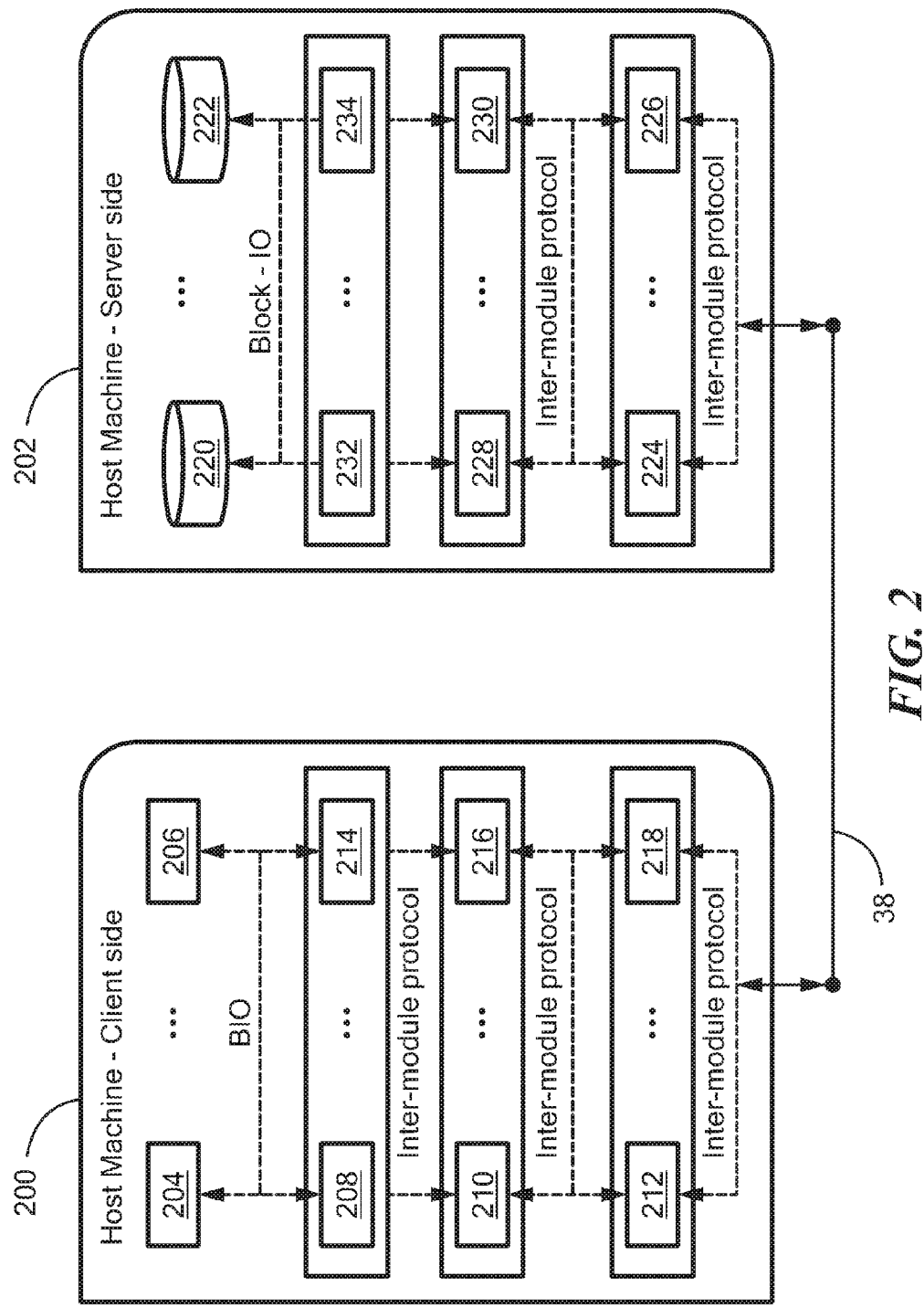
FIG. 2 is another block diagram of a computer system for providing computing services including virtual storage services.

FIG. 2 illustrates a client-side host machine 200 and a back-end host machine 202. Host machine 202 is a computing device that is executing virtual machines 204 and 206. Virtual machines 204 and 206 may be the same as or similar to virtual machines 12 and 14 in FIG. 1.

Each virtual machine 204 and 206 executes various software modules. For example, virtual machine 204 is shown executing software modules 208, 210, and 212; and virtual machine 206 is shown executing software modules 214, 216, and 218. These modules provide functionality that allows virtual machines 204 and 206 to read and write data to a virtual storage device, and to communicate with the physical servers that store the data utilizing a linked data structure an example of which will be described herein below in conjunction with FIG. 3.

In an embodiment, modules 208 and 214 are main storage modules. The main storage modules provide a storage interface for applications and other programs that access data on the virtual storage device. For example, consider a word processor application executing by a processor. The word processor program performs file IO operations to read and write files to the computer's physical hard drive. However, virtual machine 204 does not have a physical hard drive. If the same word processor program is running on the virtual machine 204, storage module 208 can provide a file TO interface that the word processor can use to read and write data to a virtual hard drive. The word processor can access software functions and hooks provided by storage module 208 to perform the file TO that it would normally perform to access a physical hard drive.

In the exemplary embodiment of FIG. 2, modules 210 and 216 respond to redistribution modules which manage requests to lower drive access layers and obtain virtual block addresses to reach the storage target. For example, when main storage module 208 performs an operation to read or write to the virtual hard drive, main storage module 208 may communicate with redistribution module 210. The distribution modules then receive the read or write request and obtain block addresses to read or write. The block addresses obtained by redistribution module 210 are virtual block addresses, i.e. they are addresses for blocks on the virtual storage device (e.g. virtual storage device 20 or 22 in FIG. 1). The redistribution modules then pass the read/write request along with the virtual storage device block addresses to modules 212 and 218.

In the exemplary embodiment of FIG. 2, modules 212 and 218 are client communication modules. These client communication modules receive requests to read and write block addresses from the redistribution modules 210 and 216. The client communication modules 210 and 216 then communicate these read and write requests to the physical servers (e.g. physical server 200) via network 38. Client communication modules 210 and 216 provide communication between the redistribution modules 210, 214 and the network 38. Client communication modules 210 and 218 also handle the timing and order of read and write requests sent and received via network 38. In embodiments, client communication modules 210 and 218 communicate over network 38 via custom protocols, industry standard protocols, protocols based on remote direct memory access (RDMA) protocols, etc.

Back-end host machine 202 is a physical processing device which functions as a storage server in the exemplary embodiment of FIG. 2. Host machine 202 may be the same as or similar to physical servers 26, 28, and/or 30 in FIG. 1. As shown in FIG. 2, host machine 202 has one or more physical storage devices (e.g. physical storage devices 220 and 222). Physical storage devices 220 and 222 may be hard drives, solid state drives, flash drives, RAID arrays, or any type physical storage device. Physical storage devices 220 and 222 are preferably non-volatile storage devices, but can be volatile storage devices if desired.

When virtual machine 204 reads data from or writes data to a virtual storage device, the read/write (RW) request and the data are sent to host machine 202 over network 38. When host machine 202 receives the data and RW request, host machine 202 reads or writes the data to physical storage device 220, physical storage device 222, or both. In order to process the RW request, host device executes various software modules including, but not limited to server modules 224 and 226, core modules 228 and 230, and cache modules 232 and 234.

Server modules 224 and 226 are software modules that provide communication over network 38 and handle incoming read and write requests from virtual machines 204 and 206. Server modules 224 and 226 also handle outgoing responses to the requests that are sent by host machine 202 to virtual machines 204 and 206. Server modules 224 and 226 manage the timing and order of the incoming requests and outgoing responses and handle communications over network 38.

Core modules 228 and 230 receive incoming read/write requests from server modules 212 and 218 and utilize a linked data structure, an example of which is described below in conjunction with FIG. 3. When core modules 228 and 230 receive the read/write request, the read/write request contains block addresses that point to blocks in the virtual storage device. Core modules 228 and 230 translate the virtual block addresses into physical block addresses that can be used to access data on physical storage devices 220 and/or 222. As noted above, this mechanism for translating between virtual block addresses and physical block addresses will be described below in greater detail (e.g. in conjunction with FIG. 3).

The read/write requests are then passed to the cache modules 232 and 234. Cache modules 232 and 234 perform the read/write requests by reading and/or writing data to the physical storage devices 220 and 222. Cache modules 232 and 234 also cache data that is read from or written to physical storage devices 220 and 222 in order to increase speed of the read/write operations.

The software modules depicted in the exemplary embodiment of FIG. 2 may utilize queue-based communications. For example, a read request generated by virtual machine 204 will be placed in a queue to be received and processed by storage module 208. Once processed, the request will be placed in a queue to be received and processed by redistribution module 210. Once processed by redistribution module 210, the request will be placed in a queue to be received and processed by communications module 212. If a response is received from host machine 202, the response may be processed by software modules 212, 210, and 208 in an opposite direction. That is, the response is first placed in a queue to be received and processed by communications module 212. Once communications module 212 processes the response, the response is placed in a queue to be received and processed by redistribution module 210. Once redistribution module 210 processes the response, the response is placed in a queue to be received and processed by storage module 208. Once the response is processed by storage module 208, the response is placed in a queue to be received by virtual machine 204 and/or an application executing on virtual machine 204.

The other software modules in FIG. 2 may also use queue-based communication schemes. For example, requests received, processed, or sent by server-side cache modules 232 and 234, core modules 228 and 230, and server modules 224 and 226 may be placed in queues for processing.

A single physical storage device may contain data belonging to multiple virtual storage devices. In other words, multiple virtual storage devices may store their data on the same physical storage devices. Additionally or alternatively, a virtual storage device may contain data that is stored on multiple physical storage devices. In order to maintain and access the data stored on a physical storage device, each storage device includes a table of contents (TOC) data structure.

Figure 3:
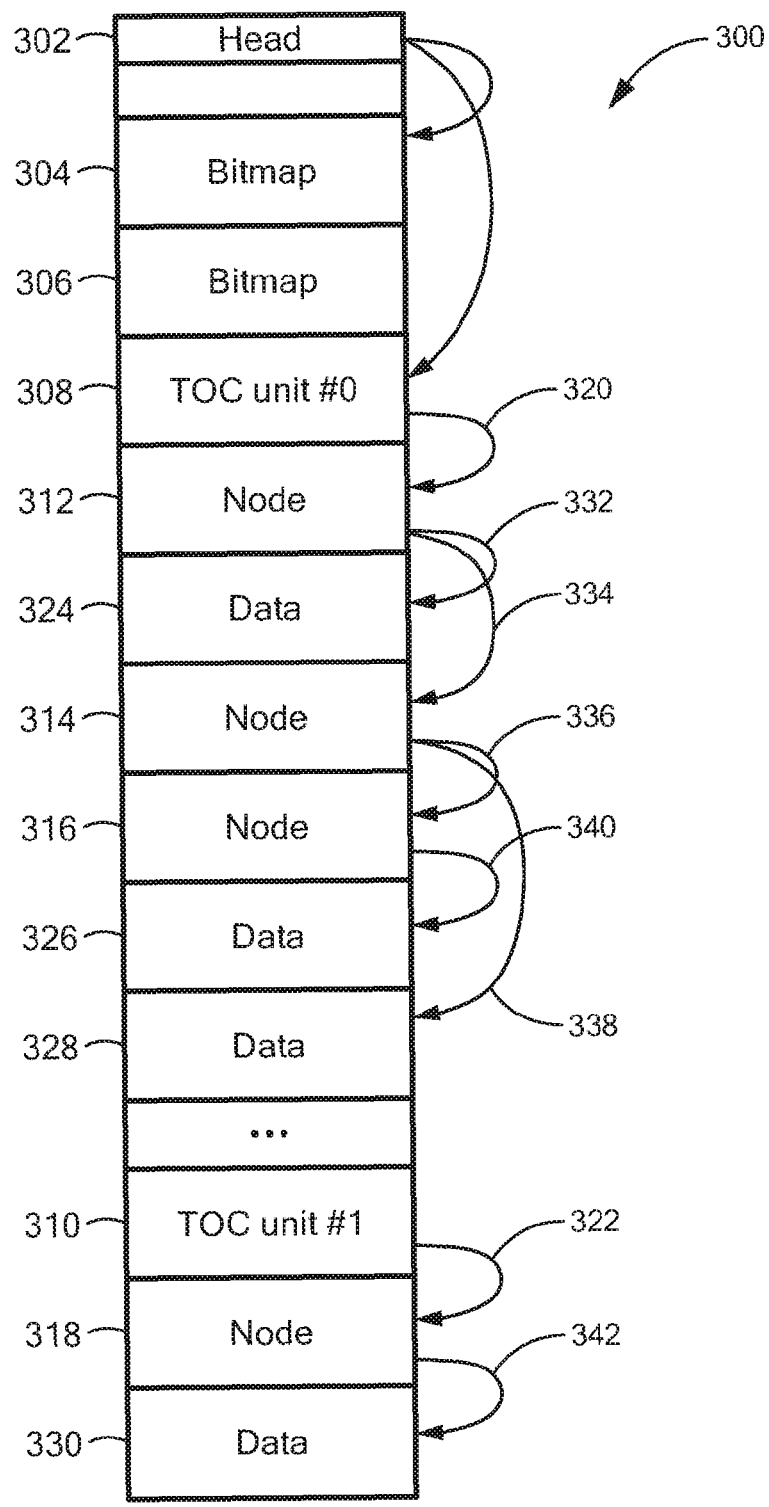
FIG. 3 is a data layout for a data structure used to organize data on a physical storage device.

Referring now to FIG. 3, in an embodiment, each physical storage device contains metadata that provides information about the physical storage device and allows the system to navigate the physical storage device to locate data. As noted above, the metadata in the allocation table is organized in a linked data structure which can be viewed and organized as a tree. Data layout 300 contains a header 302 and one or more bitmaps 304 and 306. Header 302 provides an entry or starting point for the linked data structure. In an embodiment, the header is 64K bytes in length and contains metadata that can be used to store information about the physical storage device, the host server, etc. Header 302 is located at the same address on every physical storage device so that the system can predictably find an entry into the allocation table. In an embodiment, header 302 is located at address 0 (e.g. block 0) of each physical storage device. In another embodiment, header 302 follows immediately after the master boot record (MBR) of the physical storage device. The following table provides an exemplary data layout of header 302:

| | |
|---|---|
| signature | pre-defined signature. (8 bytes) |
| revision | pre-defined revision (1.0) (4 Bytes) |
| header_size | size of this header (in little-endian) (4 Bytes) |
| header_crc | CRC32 checksum of this header (4 Bytes) |
| current_lba | sector offset of this header copy (8 Bytes) |
| backup_lba | sector offset of another header (8 Bytes) |
| first_lba | first usable sector address (LBA) (8 Bytes) |
| last_lba | last usable sector address (LBA) (8 Bytes) |
| disk_uuid | this disk's GUID (UUID) (16 Bytes) |
| part_array_start | partition entries array (8 Bytes) |
| part_array_length | number of valid partition entries (4 Bytes) |
| part_entry_size | size of GPT partition entry (4 Bytes) |
| part_array_crc | CRC32 checksum of the partition array region (4 Bytes) |

In one exemplary embodiment, the bitmaps are also 64K bytes in length. The bitmaps act as markers that identify blocks that are being used on the physical disk. Thus, if a snapshot is removed, blocks indicated by the bitmaps as unused blocks can also be removed, i.e. re-allocated.

When large amounts of data are involved, the data layout typically includes one or more table of contents (TOC) units. Data layout 300 of FIG. 3, for example, contains one or more table of contents (TOC) units 308 and 310. Each TOC unit is associated with a virtual storage device. For example, TOC unit 308 may contain information for accessing data stored into virtual storage device 20 by virtual machine 12 (see FIG. 1) and TOC 310 may contains information for accessing data stored into virtual storage device 22 by virtual machine 14 (see FIG. 1). The following table provides an exemplary data layout for TOC 310:

| Name | Length | Description |
| --- | --- | --- |
| block header | 8 Bytes | common block header |
| length | 8 Bytes | size of the whole TOC |
| previous TOC | 8 bytes | address to the previous TOC node (in sector) |
| next TOC | 8 bytes | address to the next TOC node (in sector) |
| array of disk entries | 168*n bytes | pointers to data blocks |
| total | 86048 bytes | |

In one embodiment, each TOC corresponds to a top-level entry point for accessing the data stored in the associated virtual storage device. In other words, TOC units 308 and 310 act as entry points for a linked data structure that can be used to access all the data stored in a particular virtual storage device.

TOC units 308 and 310 contain pointers to node structures 312, 314, 316, and 318. In the example shown in FIG. 3, TOC unit 308 contains a pointer to node structure 312 (indicated by arrow 320) and TOC unit 310 contains a pointer to node structure 318 (indicated by arrow 322).

Node structures are data structures that contain pointers to other node structures and/or pointers to data blocks. Node structures can vary in size and can hold a variable number of pointers. Data blocks are sections of a physical storage device in which data is stored. When a user reads or writes to a virtual device, the data accessed by the user is stored in data blocks, such as data blocks 324, 326, 328, and/or 330, on the physical storage device. Data blocks can vary in size. In one embodiment, each data block has a size that is an integer multiple of the physical storage device's block size.

As shown in FIG. 3, Node structure 312 contains a pointer to data block 324 (indicated by arrow 332) and a pointer to node structure 314 (indicated by arrow 334). Node structure 314 contains a pointer to node structure 316 (indicated by arrow 336) and a pointer to data block 328 (indicated by arrow 338). Node structure 316 contains a pointer to data structure 326 (indicated by arrow 340). Node structure 318 contains a pointer to data structure 330 (indicated by arrow 342).

Although the node structures in FIG. 3 are shown with only one or two pointers to other node structures or data blocks, node structures can contain multiple pointers. In various embodiments, node structures such as node structure 312 and the like can contain hundreds, thousands, or hundreds of thousands of pointers to other node structures and data blocks. For example, assume that the physical storage device has a block size of one megabyte, each pointer is 48 bytes, and node structure 312 has a size of 10 blocks. In this case, node structure 312 may contain approximately 10*1 Megabyte/48 bytes of pointers. In other words, node structure 312 may contain over 200,000 pointers.

Figure 4A:
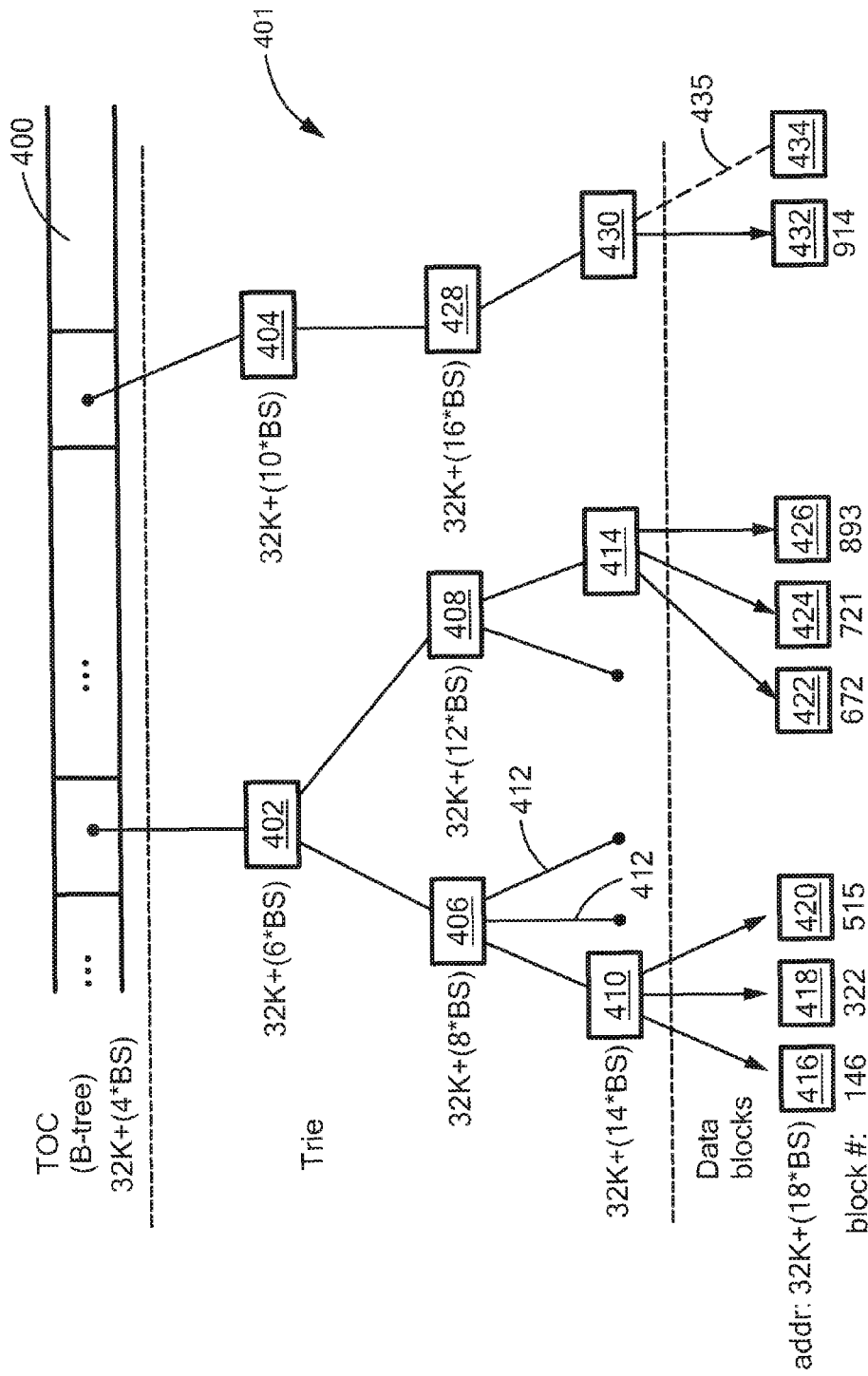
FIG. 4A and FIG. 4B are tree diagrams of a data structure used to organize data on a physical storage device.

As noted above, TOC units may be implemented as linked data structures such as tree structures. In FIG. 4A, an example TOC unit 400 is represented as a tree structure 401. The tree structure 401 is used to organize and access data stored on the physical storage device. Each read or write request received will contain an address that is to be read or written. The address provides a path through the tree structure 401 that can be traversed in order to access the data stored in data blocks on the physical storage device.

In an embodiment, the address is a block number that can be used to traverse the tree. For example, the system can traverse the levels of the tree until the block matches a pointer to a datablock. Thus any given block number may only require a number of lookups equal to the number of levels in the tree before the datablock can be identified and read.

As shown in FIG. 4A, TOC unit 400 contains pointers to node structures 402 and 404. Node structure 402 contains pointers to node structures 406 and 408. Node structure 406 contains a pointer to node structure 410, as well as points to an as yet un-instantiated node structure (as indicated by lines 412). Node structure 408 contains a pointer to node structure 414. Node structure 410 contains pointers to data blocks 416, 418, and 420; and node structure 414 contains pointers to data blocks 422, 424, and 426.

In the tree structure on the right-hand side of FIG. 4A, node structure 404 contains a pointer to node structure 428, which contains a pointer to node structure 430, which contains a pointer to data block 432. As noted above, the node structures are data structures that contain pointers to other node structures or to data blocks, and the data blocks are blocks on the physical storage device where data can be stored.

The tree data structures may contain a fixed, predetermined number of levels, i.e. a fixed depth. In the exemplary embodiment of FIG. 4A, tree structure 401 is provided having three levels with nodes 402 and 404 in a first level of the tree, node structures 406, 408, and 428 in a second level of the tree, and nodes 410, 414, and 430 in a third level of the tree. Defining a predetermined number of levels for the tree may result in a tree structure that is relatively small in size. In an embodiment, the tree structure may be sufficiently small so that it can be held in volatile memory. In an embodiment, the tree structure may be less than 10 megabytes. Also, the tree structure may be dynamically held in memory so that less frequently used parts get removed from memory again.

Figure 4B:
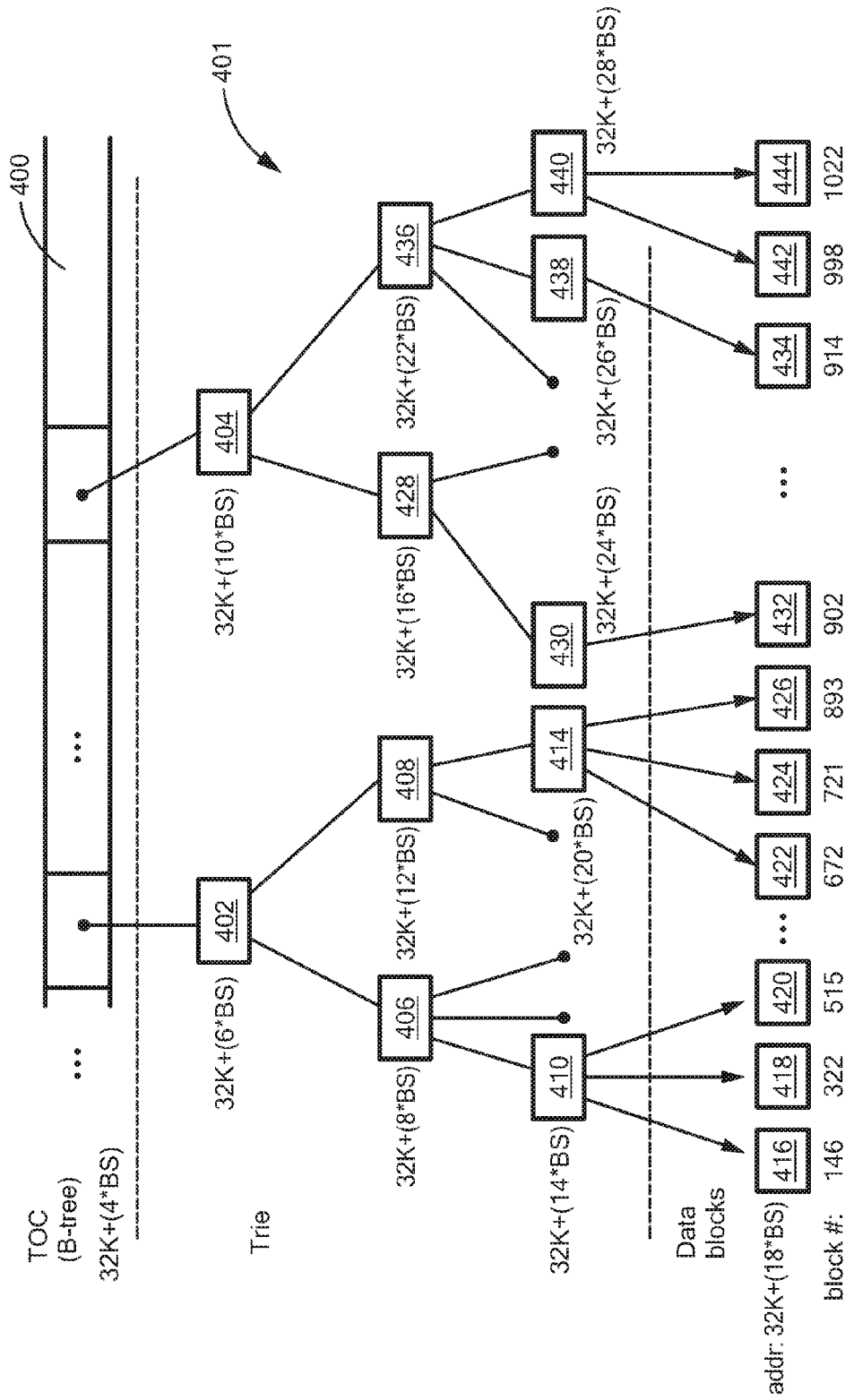

Additionally, the predetermined depth of tree structure 401 can result in a predetermined look-up time. For example, when a read or write operation is requested, the core module 228, 230 traverses the tree structure 401. If the tree has a predetermined depth, the time it takes to traverse the tree structure 401 will also be predetermined because there may be a maximum amount of lookups required to traverse the tree. In FIG. 4B, the tree structure 401 has three levels of node structures. In other embodiments, tree structure 401 can have fewer or more than three levels of node structures, as desired. Factors included in selecting the number of levels in the tree comprise: the amount of diskspace to be addressed by the tree, the overhead of the metadata in comparison to the payload data, the speed of lookups, the speed in which new nodes are created on-the-fly, etc.

Providing a tree structure having a fixed, predetermined number of levels also allows the system, when traversing the tree, to know how many levels must be traversed in order to access data. This can make accessing the data deterministic. The type of item (i.e. whether the item is a node or a data block) can be determined by its position in the tree. In the example shown in FIGS. 4A and 4B, as the system traverses the tree, the system will always access three levels of node structures before accessing the data blocks.

When a read or write operation is requested from the virtual storage device associated with TOC unit 400, the core module (e.g. core module 228 or 230 in FIG. 2) traverses tree structure 401 to access the necessary data block. Assume, for example, the core module receives a request to read the data in data block 432. The read request includes a read address. The read address will contain instructions to traverse the tree to node 404, then to node 428, then to node 430, then to data block 432. After the core module locates data block 432, the data can be read from or written to data block 432.

In one embodiment, space on the physical drive is not allocated to a virtual storage device until the space is needed or used. Such a dynamic allocation technique saves space on the physical storage device. If the storage space is never used by the virtual storage device, then the space need not be allocated on the physical storage device. Accordingly, in an embodiment, tree structure 401 points only to data blocks on the physical storage device where data has already been written. Tree structure 401 may include null pointers for addresses in the virtual storage device that have not yet been allocated space on the physical drive. When the address in the virtual storage device is first used, the system can allocate the appropriate space on the physical drive, update the tree structure 401 to point to the newly allocated space, and perform read/write operations to the newly allocated space.

FIGS. 4A and 4B provide an example of using tree structure 401 to dynamically allocate additional blocks on the physical storage device. Assume block 434 in FIG. 4A has not yet been allocated. When a write request that requires additional space is received, the core module will traverse the tree 401 to allocate the additional space. If there are null pointers available in node structure 430, the system may simply store the address of newly allocated block 434 in the null pointer, as indicated by dotted line 435. However, if no additional pointers are available in node structure 430, the system may traverse back up the tree to create additional node structures, as shown in FIG. 4B.

Turning to FIG. 4B, if no additional pointers are available node structure 430, the core module may traverse back up the tree to node 428. If node 428 has additional pointers available, the core module may create a new node structure that is a child of node structure 428. In this example, assume that node structure 428 also does not have any addition pointers available. In this case, the core module may traverse back up the tree to node structure 404. Assuming that node structure 404 has a pointer available, the core module will create a new node 436 and a new node 438, which points to the newly allocated node 434. As additional space is needed, the core module may repeat the process to allocate additional nod structures (such as node structure 440) which point to additional data blocks (such as data blocks 442 and 444).

If a read request is received for a data block that has not been written or allocated, the core module may return an error condition, or may return all "0"s instead of returning the data in the data block. This can provide a safety mechanism so that data is not inadvertently passed to a user unintentionally. If, for example, data was written to a particular data block, and subsequently the data block was de-allocated. This may happen, for example, if a virtual storage device that was being used is subsequently deleted. When the drive is deleted, the TOC unit associated with the virtual storage device may be deleted, but the data stored on the drive may or may not be wiped clean. If data blocks associated with the deleted virtual storage device are allocated to a new virtual storage device before the data blocks are wiped clean, a read request could return the data in the data block to the user. To prevent this from occurring, if a data block is newly allocated but has not yet been written, the system may return an error condition or all "0"s in response to a request to read the data block.

Figure 5:
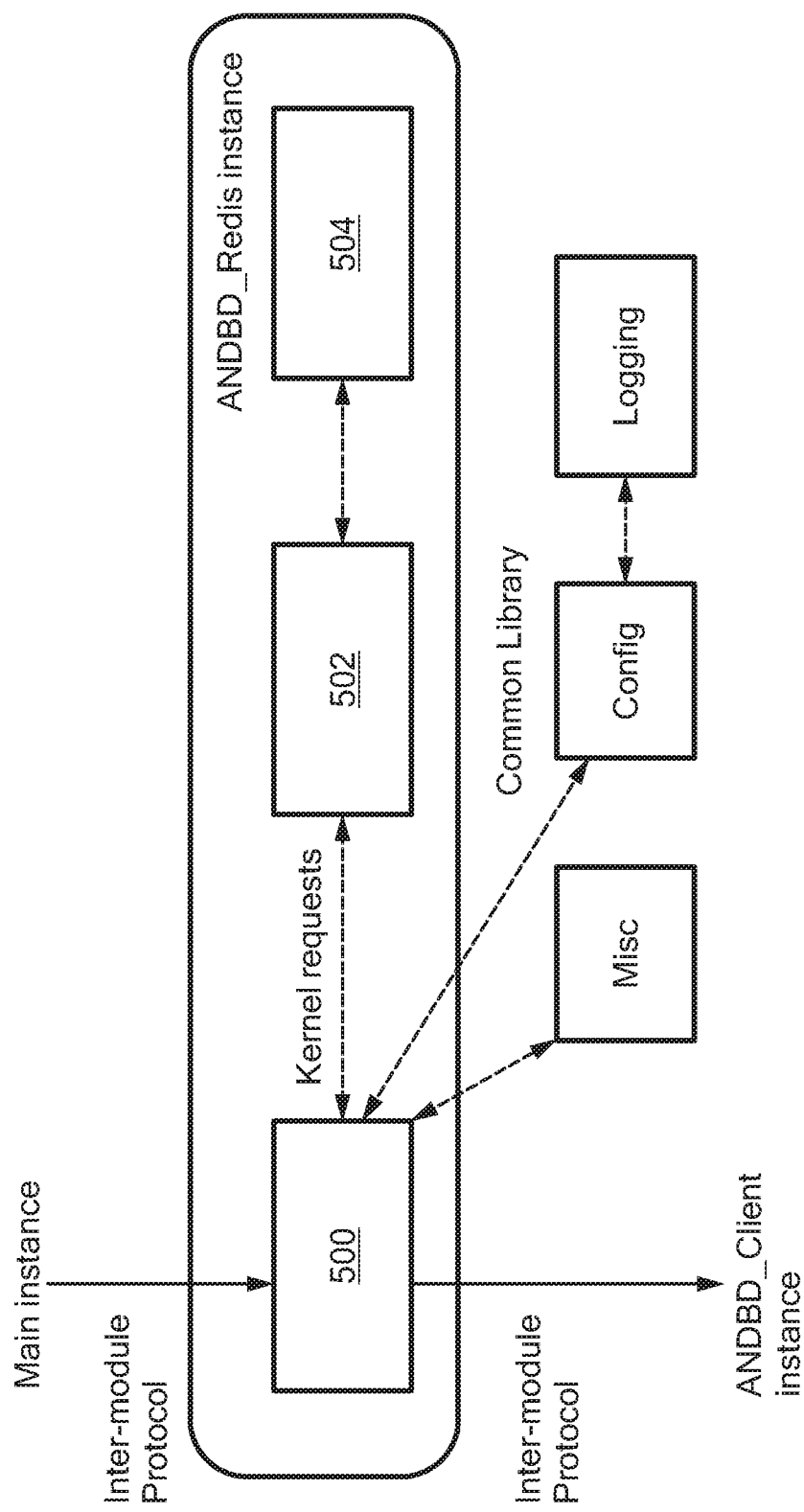
FIG. 5 is a block diagram of a software module for addressing data in a virtual storage device.

Referring to FIG. 5, a replication module 500 is shown in communication with other software modules. Replication module 500 may be the same as or similar to replication modules 210 and 216 (FIG. 2). As described above, when replicator module 500 processes read and write requests, it generates a block address for a virtual storage device. Also as noted above, virtual storage devices can be stored on one or more physical hard drives across a pool of physical hard drives and servers. The pool of drives and servers can be very large, making it difficult or time consuming to locate the correct physical hard drives and servers. In order to efficiently locate the physic hard drive(s) on which the virtual storage device and data is stored, replication module 500 may communicate with a disk locator module 502. The disk locator module 502 may access a disk locator library 504. The disk locator library 504 can contain a function that can deterministically identify the physical disk(s) on which the data is stored.

In an embodiment, disk locator library 504 can identify the physical disk(s) on which the data is stored algorithmically, without accessing a central database or data store. In other words, the function that identifies the physical disk(s) is a quasi-mathematical function of the form $f(x)=y$, where f is the function, x is the inputs, and y is the outputs. Without accessing an external database, disk locator library 504 receives inputs from disk locator module 502, processes the inputs, and produces an output that identifies the disks on which the data is stored. In an embodiment, disk locator library 504 uses the CRUSH algorithm to identify the disks. Alternative algorithms may also be used.

As an example, the system may send one or more of the virtual volume id, virtual block number, version number, customer ID, etc. as inputs to the CRUSH algorithm. In response the CRUSH algorithm may return the storage server and storage disk where the data resides.

Figure 6:
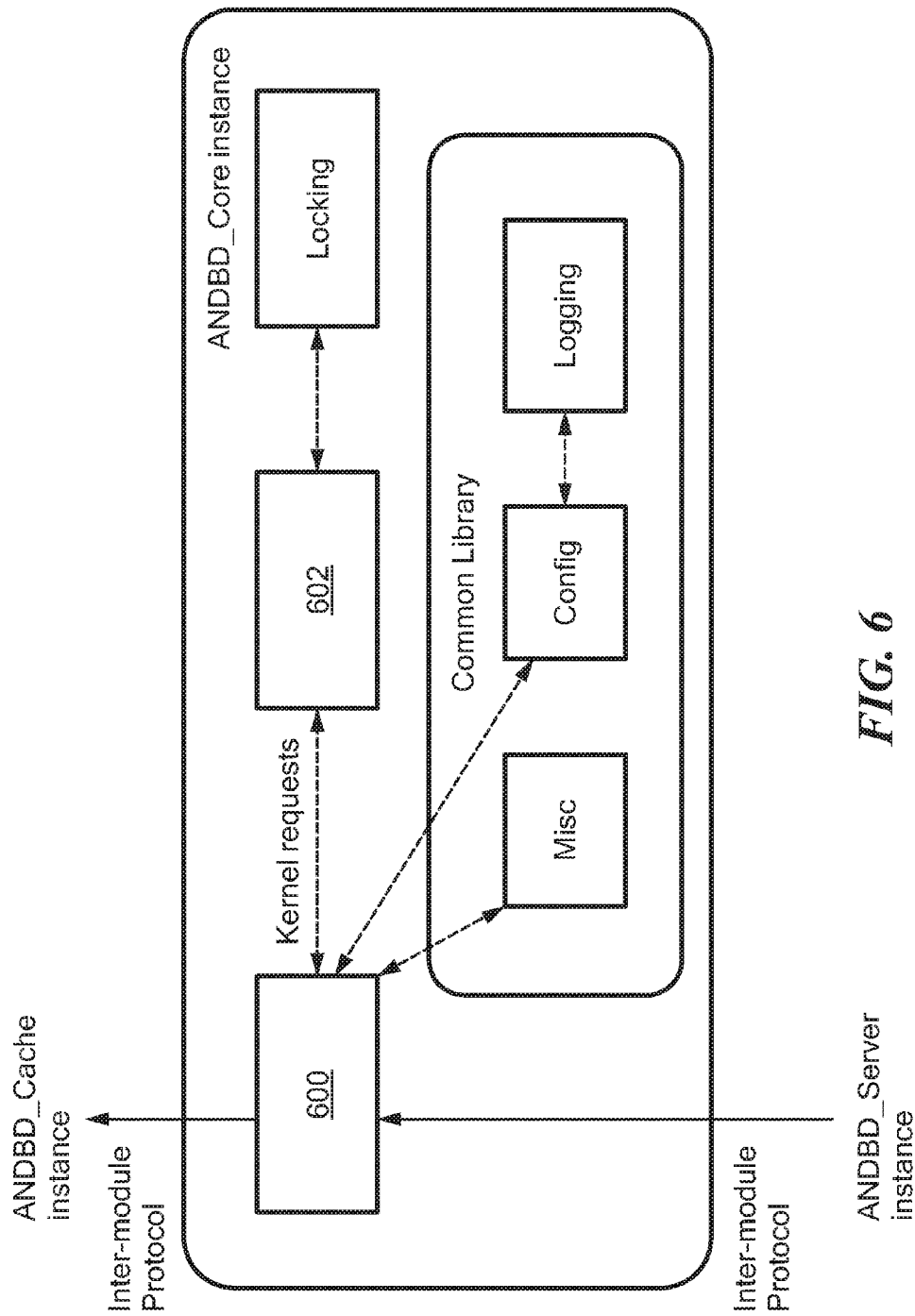
FIG. 6 is a block diagram of a software module for addressing data in a physical storage device.

Referring to FIG. 6, a core module 600 is shown in communication with other software modules. Core module 600 may be the same as or similar to core modules 228 and 230 (FIG. 2). As described above, when core module 600 receives a read or write request, it translates the virtual storage device address into a physical block address so that the system can access the data stored on the physical storage devices. In order to translate the address, core module 600 communicates with a tree traversal module 602. The tree traversal module traverses the TOC tree as described above, to find the block address of the physical drive where the data is stored. As noted above, if a write request is received and the block has not yet been written, tree traversal module 602 will allocate new blocks, update the tree, adding node structures and pointers, so that the tree points to the newly allocated blocks. Additionally, if a read request is received for a block that has not yet been written, tree traversal module 602 will return all "0"s, or a null pointer so that the read operation does not return data from a block that has not yet been written.

The tree structures described above can be used to create a snapshot of a virtual storage device. In an embodiment, the snapshot may appear, from an end-user's point of view, to be another virtual storage device having the same structure and data as its parent virtual storage device. The snapshot of the virtual storage device may provide a type of dynamic copy or image of the parent virtual storage device at the time the snapshot of the virtual storage device was created. In an embodiment, a user can read and/or write data in the snapshot of the virtual storage device without affecting the data in the parent storage device.

Figure 7A:
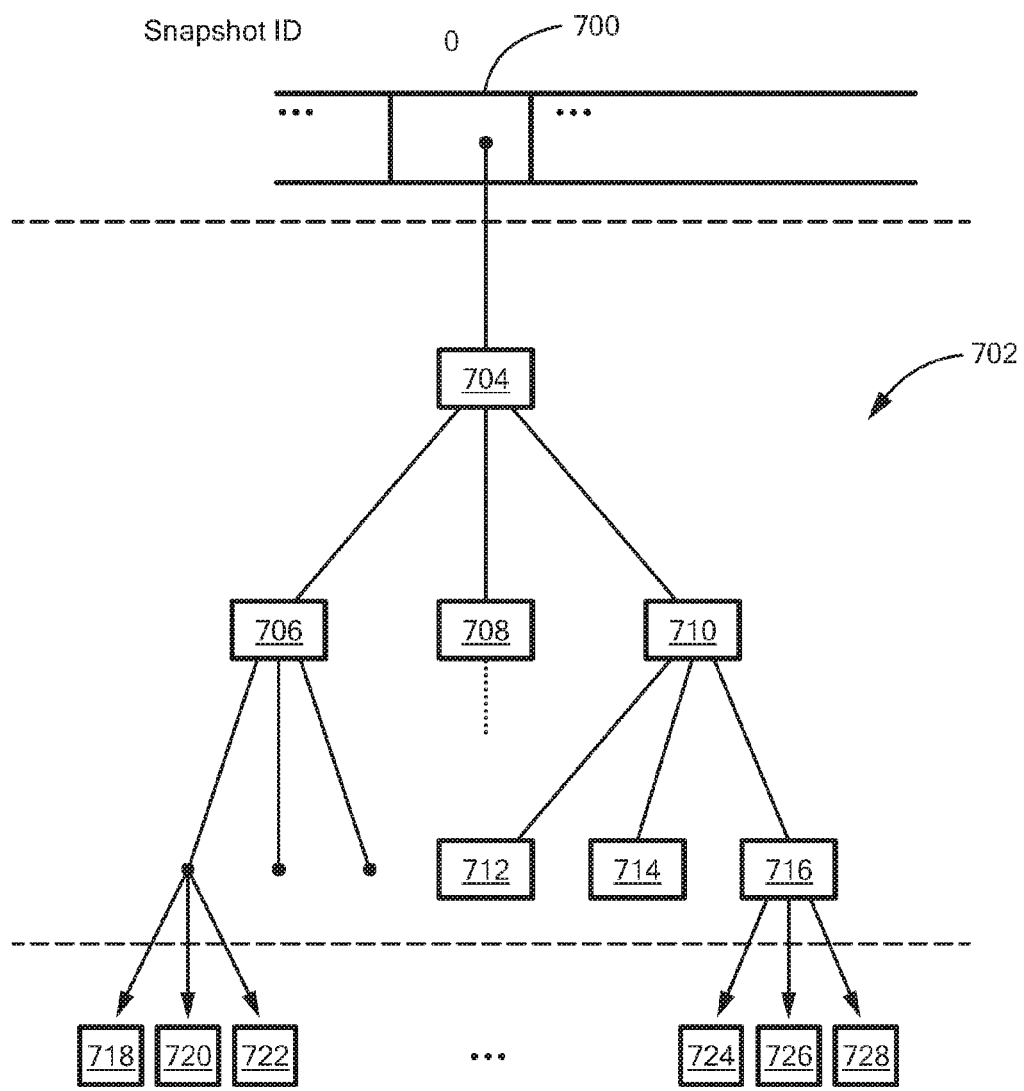
FIGS. 7A, 7B, and 7C are tree diagrams of data structure used to provide copied snapshots of a virtual storage device.

Referring to FIG. 7A, a TOC unit 700 (which is stored on a physical storage device) provides access to data for a virtual storage device. In FIG. 7, TOC unit 700 is shown prior to an imaging process being performed. TOC unit 700 includes a tree structure 702, which includes node structures 704-716. Tree structure 702 also includes, e.g. points to, data blocks 718-728. Data blocks 718-728 have been allocated to the virtual storage device described by TOC unit 700, and contain user data.

Figure 7B:
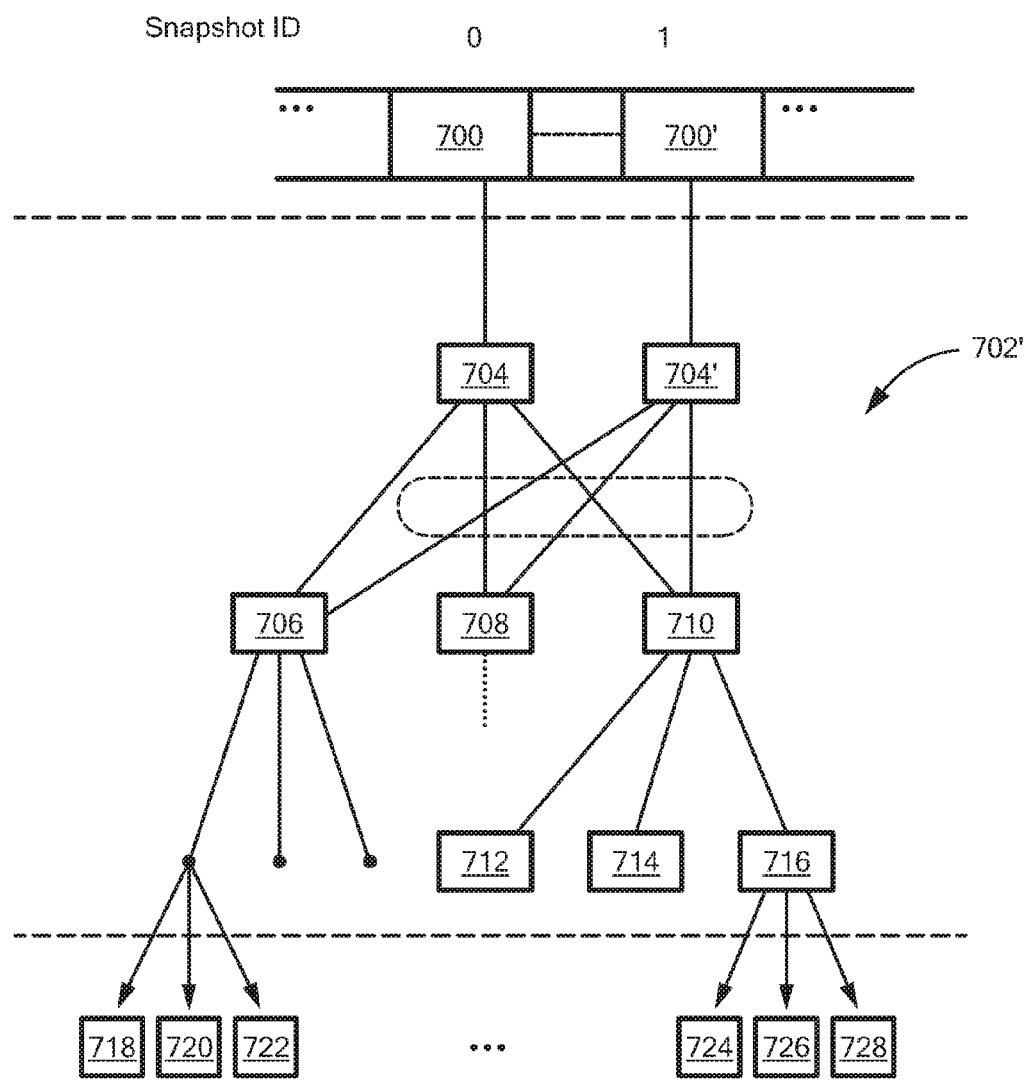

Referring to FIG. 7B, to create a snapshot of the virtual storage device, the system creates a copy 700' of TOC unit 700, and a copy 704' of top level node structure 704'. TOC unit 700' and node structure 704' can reside on the same physical storage devices as TOC unit 700 and node structure 704, or on different physical storage devices.

Node 704' may include a reference list data structure. The reference list, which may contain one or more metadata pointer records (MPR), is a set of information to point from one node structure to another, or vice versa. The MPRs are pointers (or groups of pointers) that contain several address to other nodes. The MPR may be used to point to corresponding nodes in a parent or child snapshot of a virtual storage device. The reference list indicates that node 704' is a copy of node 704, and that node 704' points to the same node structures as node 704 (namely, nodes 704 and 704' both point to node structures 706, 708, and 710). As shown in FIG. 7A, at the time the snapshot of the virtual storage device (i.e. TOC unit 700') is created, TOC 700 and 700' ultimately point to the same data blocks on the drive.

In an embodiment, creation of the snapshot of the virtual storage device may be near-instantaneous. For example, creating the snapshot may take only the amount of time necessary to write a single block of data to the physical storage device. This is because the table of contents created to define the snapshot may fit in a single block on the physical storage device, in various embodiments.

If the data has not been changed after creation of the snapshot, read operations on both the parent virtual storage device and the snapshot of the virtual storage device will access the same data. For example, assuming that a read operation is received to read data from data block 728 on the parent drive, the system will traverse the tree by accessing TOC unit 700, following a pointer to node structure 704, following another pointer to node structure 710, following another point to node structure 716, and finally following another node structure to access data block 728. Now assuming that a read operation is received to read data from block 728 on the snapshot of the drive, the system will traverse the tree by accessing copied TOC unit 700', following a pointer to node structure 704', following another pointer to node structure 710, following another point to node structure 716, and finally following another node structure to access the same data block, data block 728.

For write operations to the snapshot of the virtual storage device, the system will copy portions of the tree and the data block to be written into the snapshot of the tree prior to performing the write. This is referred to as a copy on write operation. Assume that a write request is received to write data to data block 728 of the parent virtual storage device. If the system writes the data to data block 728, the newly written data will appear in both the parent virtual storage device and the snapshot of the virtual storage device, because both TOC units 700 and 700' point to data block 728. For the same reason, if the system writes data to block 728 of the snapshot of the virtual storage device, then the change will appear in both the parent virtual storage device and the snapshot of the virtual storage device. Therefore, if a write operation is received to write data to a data block of either the parent virtual storage device or the snapshot of the virtual storage device, the system will make a copy of the data block to be written. Thereafter, the system may change the pointer(s) of the volume being written to, leaving the pointers of any other volumes referring to the same datablock intact, thus pointing to the old datablock.

Figure 7C:
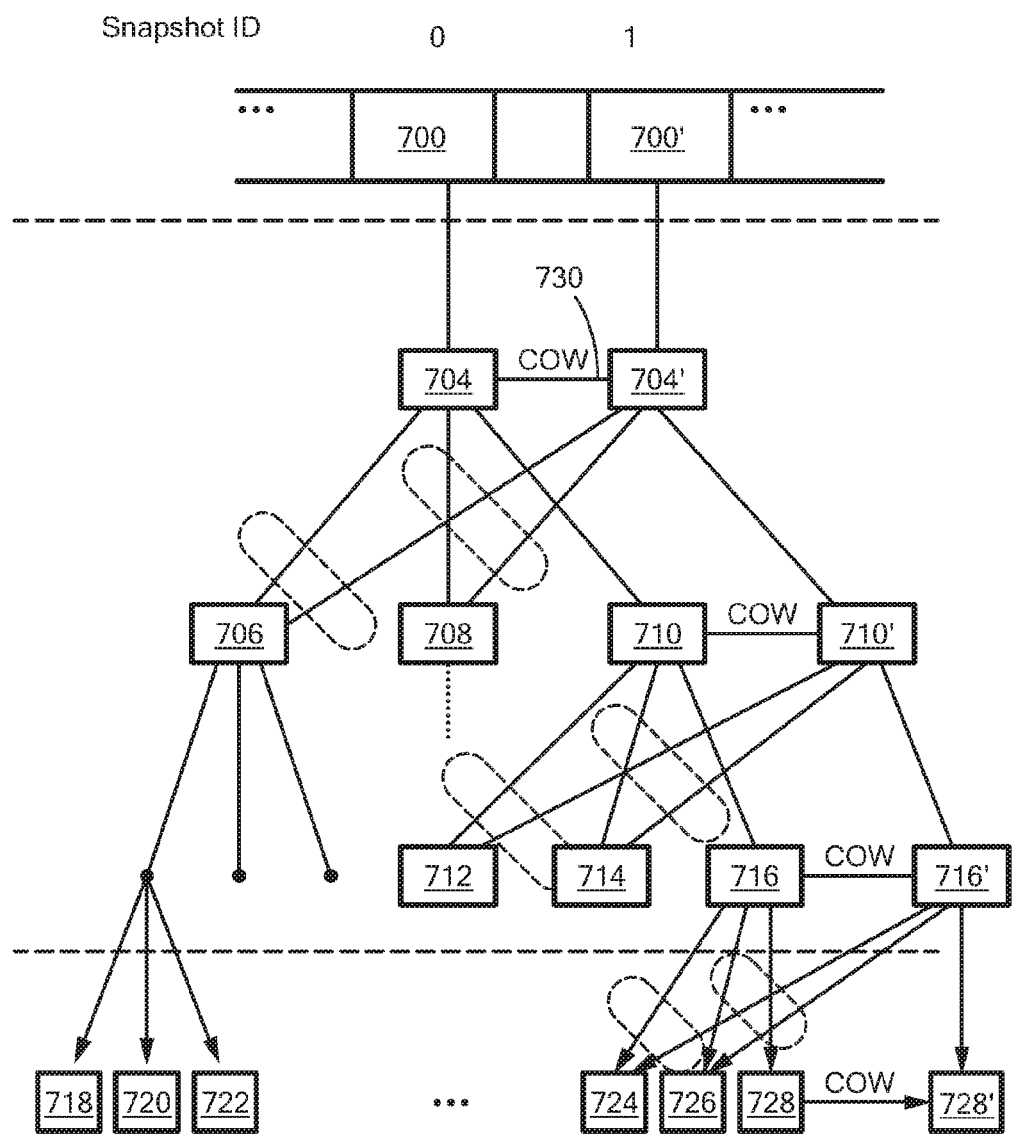

Referring to FIG. 7C, if a write operation is received to write to block 728, the system will read the reference lists associated with TOC units 700 and 700', and with node structures 704 and 704'. The reference lists will inform the system that data block 728 is accessed by both the parent virtual storage device (e.g TOC unit 700) and the snapshot of the virtual storage device (e.g. TOC unit 700'). The system will then update the snapshot 700' to point to a newly allocated data block, and writes the new data to the new location.

As shown, to access data block 728, the system must traverse node structures 704, 710, and 716. When the write operation is received, the system will copy node 704 to node 704' and create a reference list in each node. The reference list is indicated by horizontal line 730. The reference list acts as a pointer between nodes 704 and 704'. The reference list also informs the system that there is a snapshot of the drive that points to at least some of the same data blocks as the parent drive.

The system then copies node 710 to a new node 710' and creates a reference list between node 710 and 710', then copies node 716 to new node 716' and creates a reference list between node 716 and 716'. The system also updates node 704' to remove the pointer to node 710 and add a pointer to node 710', updates node 710' to remove the pointer to node 716 and add a pointer to node 716'. Finally, the system allocates a new data block 728' on the physical storage device, writes the new data to block 728', and updates node 716' to remove the pointer to data block 728 and add a pointer to data block 728'.

Once the new data has been written to data block 728', write operations to block 728 of the parent virtual storage drive will be performed on block 728, and write operations to block 728 of the snapshot of the virtual storage drive will be performed on block 728'.

Copied node structures 704', 710', and 716' will retain pointers to data blocks and node structures that have not yet been written. For example, data block 718 has not yet been written. Thus, both node structures 704 and 704' contain pointers to node structure 706, which ultimately points to data block 718. This allows read operations on either the parent virtual storage device or the snapshot of the virtual storage device to access the same data block 718. Likewise, data block 724 has not yet been written. Therefore, both node structures 716 and 716' contain pointers to node structure 724. If a write operation is received to write to data block 718 or 724 (or to any block that has not yet been written), the system will allocate a new data block, copy the data from the data block into the new data block, and associate the new data block with the snapshot of the virtual storage device as described above.

To remove snapshot of the virtual storage device 700', the system will remove TOC unit 700', node structures 704', 710', and 716', and de-allocate data block 728'. The system can also remove parent virtual storage device 700 by removing TOC unit 700, node structures 704, 710, and 716, and data block 728. Removing these data structures will result in removal of the parent virtual storage device, while leaving the snapshot of the virtual storage device 700' intact, including any changes made to virtual storage device 700' via write operations.

In an embodiment, the following algorithm (illustrated by pseudo code) can be used to copy an data block (i.e. to perform a copy on write operation) prior to a write operation. In the pseudo-code, A, B, C, M, N, and P represent nodes.

```
for each level in the tree:
for each child node of a current node:
    Label a child node M if it is bound to other MPRs in a reference
list L:
    clone A into B;
    detach M from L;
    Assume that C is the common child of A and B.
    for each MPR N from B to C:
        if N_orig is MPR from A to C:
            insert N into a reflist L__new that includes
            N_orig
        else: (M is standalone)
        if P is leaf:
            copy data block A into B;
        exit;
        else: (P is not leaf)
step down to the next level
Repeat
```

Figure 8:
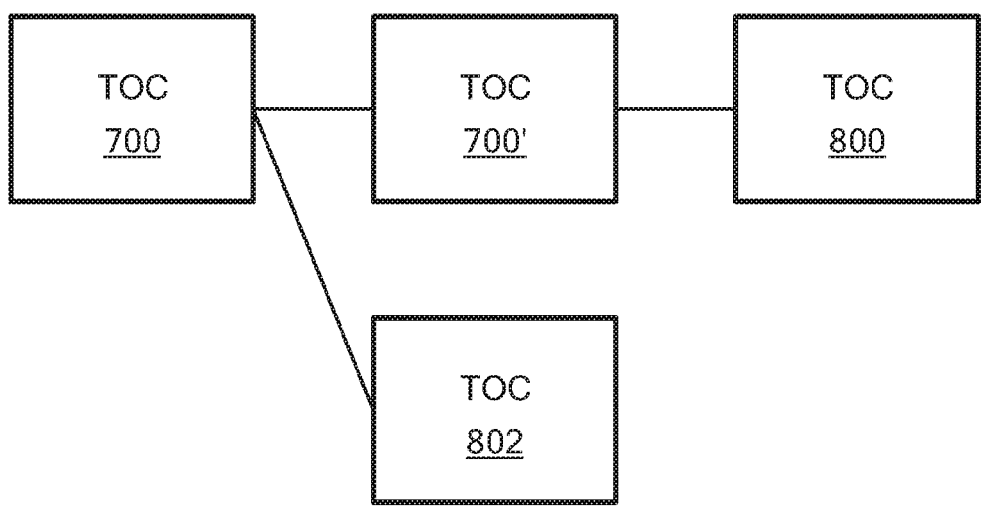
FIG. 8 is a block diagram of copied snapshots of virtual storage devices.

Referring to FIG. 8, the system can contain multiple snapshots of virtual storage devices on a single hard drive. (not really a parent/child relationship between virtual device and harddisk) As described above, TOC unit 700 may be a parent to TOC unit 700'. However, TOC unit 700 can be a parent drive to other snapshots of virtual storage devices, such as the snapshot of storage device 802, simultaneously. In this embodiment, if a write request is received to write an unwritten data block in TOC unit 700, the system will copy the unwritten data block to the snapshot of virtual storage device 700' and to the snapshot of virtual storage device 802. If a write operation is received to write a data block in the snapshot of virtual storage device 700', the system will copy the data block to the snapshot of virtual storage device 700', but not to the snapshot of virtual storage device 802. Since data has not been written to either parent virtual storage device 700 or the snapshot of virtual storage device 802, both virtual storage devices can continue to point to the same data block.

In an embodiment, because the snapshots comprise pointers, and because copying of data from one virtual drive to a snapshot of a virtual drive only takes place if data is written to, the system can contain and manage a plurality of snapshots without a degradation in performance. For example, the system may contain 10, 100, 1000, or more than 65000 snapshots of the same volume without degradation of performance. This is because the time it takes to access the parent drive through the first table of contents and the time it takes to access the snapshot of the drive through the second table of contents may be the same, because the parent and child tables of contents may be similar structures and may be accessed using the same or a similar method.

A snapshot of a virtual storage device can also act as a parent virtual storage device. As shown, virtual storage device 700' may be a parent to virtual storage device 800. In this case, if a previously unwritten data block is written to parent virtual storage device 700, the system will copy the data block (prior to the write operation) to virtual storage device 700'. The TOC units will be updated so that virtual storage device 700' and 800 point to the copied data block.

Copying portions of the parent virtual storage device to the snapshot of the virtual storage device when read operations are received has various advantages. It reduces the amount of space used on the physical storage device because only the data blocks that have been written are copied. It also allows a snapshot to be created on the fly. In other words, a snapshot can be created at any time, even if the parent drive is live and under load, i.e. being used by the system. It also allows a user to manipulate the data in the parent drive without making changes to the data in the snapshot of the drive, and vice versa. Other advantages are also provided by the system.

Figure 9:
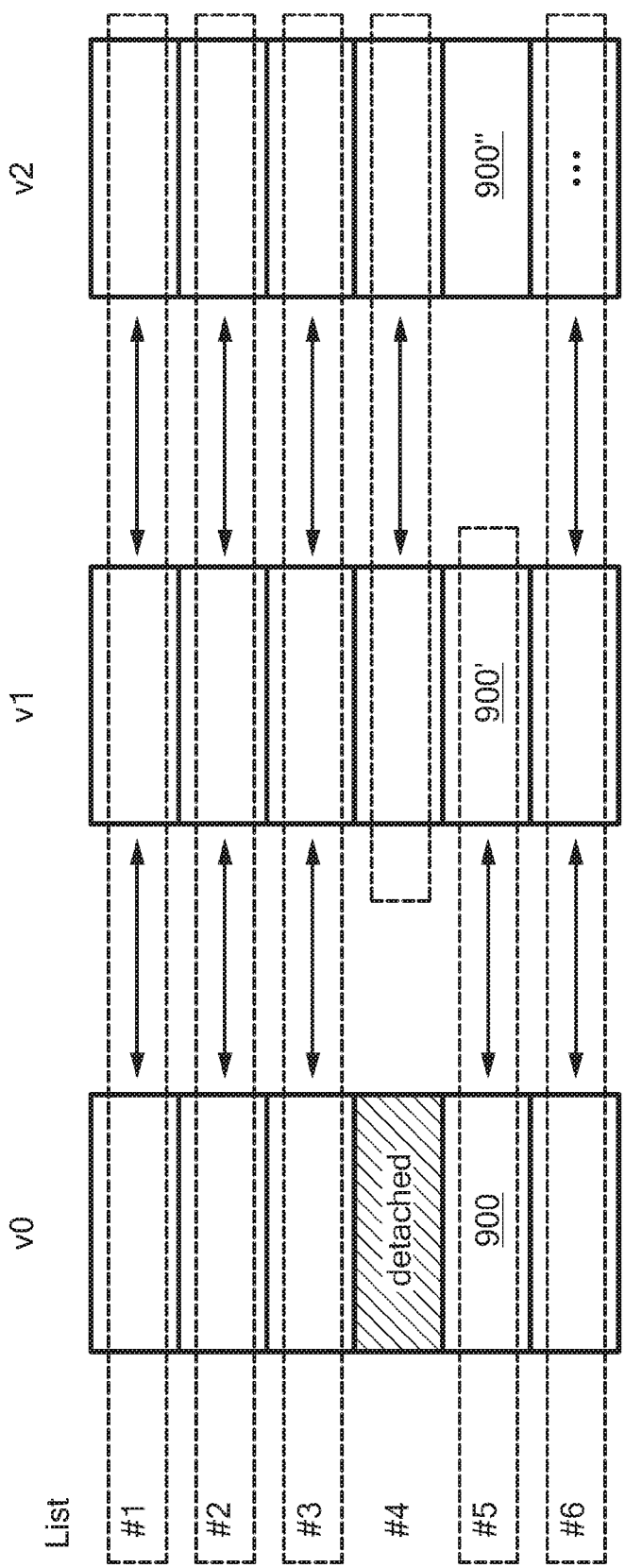
FIG. 9 is a block diagram of a reference list.

Referring to FIG. 9, a reference lists 1 through 6 contains multiple MPRs. For example, reference list 5 is shown to contain MPR 900 and 900'). In this example, the v0 corresponds to a parent virtual storage device, v1 corresponds to an snapshot of a virtual storage device that has v0 as its parent, and v2 corresponds to a snapshot of a virtual storage device that has v1 as its parent.

Prior to the creation of v1 and v2, MPR 900 is the only MPR is reference list 5. Upon creation of the snapshot of the virtual storage device v1, reference list 5 is updated to contain MPR 900', which is associated with a node structure in v1. MPR 900 contains a pointer that points to MPR 900', and vice versa. Thus, when a read request accesses the node structure associated with either MPR 900 or MPR 900', the read request will ultimately access the same data locations, whether the read access was directed toward parent virtual storage device v0 or the snapshot of the virtual storage device v1.

Upon creation of the snapshot of the storage device v2, reference list 5 will contain another MPR 900". Upon creation of MPR 900", MPR 900" will contain a pointer to MPR 900' and MPR 900' will contain a pointer to MPR 900". Thus, MPRs 900, 900', and 900" will all point to the same data blocks.

Because MPR 900' and MPR 900" are linked, when the system receives a request to write data to v2, the system will copy the data block to be written, as described above. (See FIG. 7C). The copy operation will ensure that the write request to v2 will only change data associated with virtual storage device v2, and will not change the data associated with virtual storage devices v0 and v1.

Once the data has been copied, the system will also update reference list 5 so that MPR 900" (associated with v2) and MPR 900' (associated with v1) are no longer linked, as shown by the lack of an arrow between MPR 900' and 900" in FIG. 9. The system will create a new reference list 8 that contains only MPR 900". Detaching the link between MPR 900' and 900" tells the system that the copy on write operation is not required for subsequent write requests to the data block in v2. Thus, because reference list 8 has only a single MPR 900" associated with it, future writes to the data block in v2 that access MPR 900" will not trigger a copy on write operation.

Figure 10:
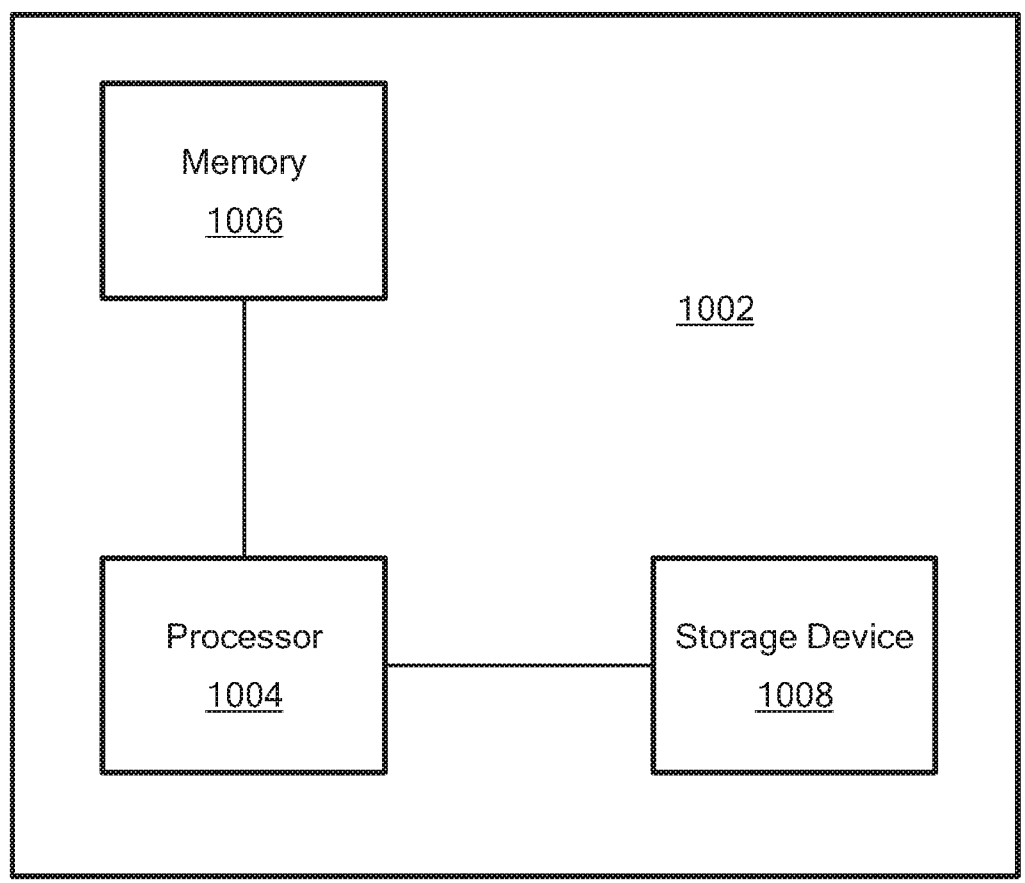
FIG. 10 is a block diagram of a computing device.

Referring to FIG. 10, the systems and methods described herein may be implemented hardware, software, or a combination. Software may comprise software instructions stored on one or more computer readable medium which, when executed by one or more processors, cause the processors to perform operations that implement the systems and methods. In FIG. 10, an exemplary computing device 1002 contains a processor 1004, a memory 1006, and a physical storage device 1008. Computing device 1002 may be a computer, a laptop, a server, a smart phone, or any type of computing device. Memory 1006 may be a volatile memory such as a RAM, and physical storage device 1008 may be a non-volatile storage device such as a hard drive, CD, DVD, flash drive, or the like.

In operation, processor 1004 accesses memory 1006 and/or storage device 1008 to read and execute computer readable software instructions that are stored on memory 1006 and/or storage device 1008. The computer readable software instructions, when executed by the processor, cause the processor to perform operations in accordance with the systems and methods described in this application.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the following claims.

What is claimed is:

1. A system for providing access to data storage through two or more virtual storage devices, the system comprising:
   a parent virtual storage device;
   a second virtual storage device that is a copy of the parent virtual storage device;
   at least one physical server comprising at least one physical storage device containing data shared by the parent virtual storage device and the second virtual storage device;
   a data structure, stored on each of the at least one physical storage devices, the data structure comprising:
      a first table of contents associated with the parent virtual storage device, the first table of contents comprising a first set of node structures containing pointers to one or more other node structures and/or pointers to storage locations within the physical storage device, the first table of contents configured to map storage locations within the virtual storage device to the node structures to provide a mapping between storage locations within the parent virtual storage device and corresponding storage locations within the physical storage device;
      a second table of contents associated with the second virtual storage device, wherein the second table of contents is a copy of at least a portion of the first table of contents, the second table of contents comprising a second set of node structures containing pointers to one or more other node structures and/or pointers to storage locations within the physical storage device, the second table of contents configured to map storage locations within the virtual storage device to the node structures to provide a mapping between storage locations within the second virtual storage device and corresponding storage locations with the physical storage device, wherein one or more of the node structures are-shared by the first and second tables of contents; and
   one or more software modules executed by the virtual server, the physical server or both, configured to receive requests to access data in the storage locations within the virtual storage devices and, in response to the requests, traverse the data structure to access data in the corresponding storage locations within the physical storage device.

2. The system of claim 1 wherein each table of contents comprises a tree structure having a predetermined number of hierarchical levels, each level containing the node structures, wherein the node structures contain pointers to other node structures or to data locations on the physical storage device.

3. The system of claim 1 wherein the software module is configured to make additional copies of the first or second virtual storage device by copying the table of contents associated with the virtual storage device to a new table of contents.

4. The system of claim 1 wherein the node structures are associated with reference lists.

5. The system of claim 4 wherein the reference lists contain metadata pointer records (MPR) that provide links between node structures within the reference lists.

6. The system of claim 1 wherein the software module is configured to perform a copy on write operation when a write request is received to write to a previously unwritten data block associated with both the first and second tables of contents.

7. The system of claim 6 wherein the copy on write operation comprises allocating a new data block and copying the contents of the data block to the new data block.

8. The system of claim 6 wherein the copy on write operation comprises copying at least a portion on a tree structure associated with the first table of contents into a tree structure associated with the second table of contents.

9. The system of claim 6 wherein the copy on write operation comprises updating a reference list associated with node structures in the first and second tables of contents.

10. The system of claim 9 wherein the copy on write operation further comprises removing a link between a node structure in the first table of contents and a node structure in the second table of contents.

11. The system of claim 10 wherein the copy on write operation further comprises creating a new reference list associated with one of the node structures.

12. The system of claim 1 wherein the storage locations mapped by the first table of contents and the storage locations mapped by the second table of contents reside on a different physical servers.

13. The system of claim 1 further comprising a plurality of tables of contents each associated with a respective virtual storage device, wherein each respective virtual storage device is a copy of the first virtual storage device.

14. The system of claim 13 wherein the plurality of tables of contents comprises at least 10, at least 100, at least 1000, or at least 65,000 tables of contents.

15. A method for providing data storage, the method comprising:
   executing, by a computing device, at least one virtual server comprising at least one virtual storage device;
   associating the virtual storage device with at least one physical server comprising at least one physical storage device;
   storing a data structure on each of the at least one physical storage devices, the data structure comprising:
      a first table of contents associated with a parent virtual storage device, the first table of contents comprising a first set of node structures containing pointers to one or more other node structures and/or pointers to storage locations within the physical storage device, the first table of contents configured to map storage locations within the virtual storage device to the node structures to provide a mapping between storage locations within the parent virtual storage device and corresponding storage locations within the physical storage device;
      a second table of contents associated with a second virtual storage device, wherein the second table of contents is a copy of at least a portion of the first table of contents, the second table of contents comprising a second set of node structures containing pointers to one or more other node structures and/or pointers to storage locations within the physical storage device, the second table of contents configured to map storage locations within the virtual storage device to the node structures to provide a mapping between storage locations within the second virtual storage device and corresponding storage locations with the physical storage device, wherein one or more of the node structures are-shared by the first and second tables of contents; and executing, by the virtual server, the physical server or both, one or more software modules configured to receive requests to access data in the storage locations within the virtual storage devices and, in response to the requests, traverse the data structure to access data in the corresponding storage locations within the physical storage device.

16. The method of claim 15 further comprising associating each table of contents with a tree structure having a predetermined number of hierarchical levels, each level containing the node structures, wherein the node structures contain pointers to other node structures or to data locations on the physical storage device.

17. The method of claim 15 further comprising making copies of the first or second virtual storage device by copying the table of contents associated with the virtual storage device to a new table of contents.

18. The method of claim 15 further comprising associating reference lists with the node structures, wherein the reference lists contain one or more of the node structures.

19. The method of claim 18 wherein the reference lists contain metadata pointer records (MPR) that provide links between node structures within the reference lists.

20. The method of claim 15 further comprising performing a copy on write operation when a write request is received to write to a previously unwritten data block associated with both the first and second tables of contents.

21. The method of claim 20 wherein the copy on write operation comprises allocating a new data block and copying the contents of the data block to the new data block.

22. The method of claim 20 wherein the copy on write operation comprises copying at least a portion on a tree structure associated with the first table of contents into a tree structure associated with the second table of contents.

23. The method of claim 20 wherein the copy on write operation comprises updating a reference list associated with node structures in the first and second tables of contents.

24. The method of claim 23 wherein the copy on write operation further comprises removing a link between a node structure in the first table of contents and a node structure in the second table of contents.

25. The method of claim 24 wherein the copy on write operation further comprises creating a new reference list associated with one of the node structures.

26. The method of claim 15 further comprising creating a snapshot of the parent virtual storage device by creating the second table of contents associated with the second virtual storage device.

27. The method of claim 25 the snapshot is created in the time it takes to write a single block to the physical storage device.

28. A system for providing access to data storage, the system comprising:

a parent virtual storage device;

a second virtual storage device that is a copy of the parent virtual storage device;

at least one physical server comprising at least one physical storage device containing data shared by the parent virtual storage device and the second virtual storage device;

a data structure, stored on each of the at least one physical storage devices, the data structure comprising:

a first table of contents associated with the parent virtual storage device, the first table of contents configured to map storage locations within the parent virtual storage device to node structures that provide pointers to corresponding storage locations within the physical storage device;

a second table of contents associated with a second virtual storage device which is a copy of the first virtual storage device, the second table of contents configured to map storage locations within the second virtual storage device to node structures that provide pointers to corresponding storage locations with the physical storage device, wherein at least some of the node structures and storage locations are shared by the first and second tables of contents; and one or more software modules executed by the virtual server, the physical server or both, configured to:

receive a first request to access data in the first virtual storage device, in response to the first request traverse the first table of contents to access data in the corresponding storage locations within the physical storage device;

receive a second request to access data in the second virtual storage device; and in response to the second request, traverse the second table of contents to access data in the corresponding storage locations within the storage device;

wherein the storage locations shared by the first and second table of contents can be accessed through both the first and second tables of contents.

* * * * *